(12) United States Patent
Mantra

(10) Patent No.: US 11,562,151 B2
(45) Date of Patent: Jan. 24, 2023

(54) GENERATING COMMUNICATIONS IN PATIENT-SPECIFIED LANGUAGES

(71) Applicant: CERNER INNOVATION, INC., Kansas City, KS (US)

(72) Inventor: Ravi Mantra, Bengaluru (IN)

(73) Assignee: CERNER INNOVATION, INC., North Kansas City, MO (US)

( * ) Notice: Subject to any disclaimer, the term of this patent is extended or adjusted under 35 U.S.C. 154(b) by 281 days.

(21) Appl. No.: 16/917,310

(22) Filed: Jun. 30, 2020

(65) Prior Publication Data
US 2021/0406482 A1   Dec. 30, 2021

(51) Int. Cl.
G06F 40/58  (2020.01)
H04W 4/14  (2009.01)
H04L 51/046  (2022.01)
G06F 40/263  (2020.01)

(52) U.S. Cl.
CPC ............ *G06F 40/58* (2020.01); *G06F 40/263* (2020.01); *H04L 51/046* (2013.01); *H04W 4/14* (2013.01)

(58) Field of Classification Search
None
See application file for complete search history.

(56) References Cited

U.S. PATENT DOCUMENTS

| 11,200,967 | B1* | 12/2021 | Jain | G16H 50/70 |
| 2003/0088543 | A1* | 5/2003 | Skeen | G06F 40/12 |
| 2010/0131923 | A1* | 5/2010 | Oon | G16H 10/60 |
| | | | | 707/769 |

* cited by examiner

Primary Examiner — Quynh H Nguyen
(74) Attorney, Agent, or Firm — Shook, Hardy & Bacon L.L.P.

(57) ABSTRACT

Methods, systems, and computer-readable media are provided for communicating healthcare-related information in languages specified by communication recipients (e.g., patients and/or patient proxies) utilizing a healthcare IT platform. Aspects herein provide a tool for applying language maps specific to patient-specified languages to information associated with one or more segments of Health Level 7 (HL7) messages to generate communications that can be consumed and understood by communication recipients regardless of the language in which such communication recipients prefer to communicate and whether or not a communication recipient's preferred language is the same as that of a communicating healthcare provider or organization.

20 Claims, 5 Drawing Sheets

GENERATING COMMUNICATIONS IN PATIENT-SPECIFIED LANGUAGES

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present technology is defined by the claims as supported by the Specification, including the Detailed Description and Drawings.

In brief and at a high level, this disclosure describes, among other things, methods, systems, and computer-readable media for communicating healthcare-related information in languages specified by communication recipients (e.g., patients and/or patient proxies) utilizing a healthcare IT platform (such as Cerner Corporation manufactured software). As will be described, the present technology provides a tool for applying language maps specific to patient-specified languages to information associated with one or more segments of Health Level Seven (HL7) messages and generating outputs that may be utilized to generate and deliver communications that can be consumed and understood by communication recipients regardless of the language in which such communication recipients prefer to communicate and whether or not a communication recipient's preferred language is the same as that of a communicating healthcare provider or organization.

In one aspect of the present technology, a computerized method is provided. The computerized method comprises receiving a HL7 message having a plurality of segments, at least a portion of the plurality of segments having information associated therewith that is to be utilized to generate a healthcare-related communication to be delivered to a communication recipient (for instance, a patient or a proxy or delegate authorized by a patient to receive healthcare-related communications on the patient's behalf). The method further comprises determining, based on a first of the plurality of segments of the HL7 message, a language in which the healthcare-related communication is to be generated. Still further, the method comprises applying a language map specific to the determined language (for instance, a language map created for the determined language using an instrumental view of language) to at least a portion of the information associated with the portion of the plurality of segments of the HL7 message to generate an output to be utilized to generate the healthcare-related communication in the determined language.

In another aspect, the present technology provides one or more non-transitory computer-readable media having computer-executable instructions embodied thereon that, when executed, perform a method. In accordance with the media, the method performed comprises receiving a HL7 message having a plurality of segments, at least a portion of the plurality of segments having information associated therewith that is to be utilized to generate a healthcare-related communication to be delivered to a patient (or patient proxy). Further, the method comprises determining, based on a first of the plurality of segments of the HL7 message, a patient-specified (or proxy-specified) language in which to the healthcare-related communication is to be generated. Still further, the method comprises selecting a language map configured to utilize at least a portion of the information associated with the at least the portion of the plurality of segments of the HL7 message to generate a patient-specified-language-specific output to be utilized to deliver the communication in the patient-specified language, and generating the patient-specified-language-specific output by applying the selected language map to the at least the portion of the information associated with the at least the portion of the plurality of segments of the HL7 message. The method further comprises generating, in the patient-specified language, the communication to be delivered to the patient.

In yet another aspect, the present technology provides one or more non-transitory computer-readable media having computer-executable instructions embodied thereon that, when executed, perform a method. In accordance with the media, the method performed comprises receiving a HL7 message having a plurality of segments, at least a portion of the plurality of segments having information associated therewith that is to be utilized to generate a healthcare-related communication to be communicated to a patient (or patient proxy). The method further comprises determining, based on a first of the plurality of segments of the HL7 message, a patient-specified language in which the healthcare-related communication is to be generated, and determining, based on a second of the plurality of segments of the HL7 message, a patient-specified communication protocol to be utilized to deliver the healthcare-related communication in the patient-specified language. In embodiments, the first segment and the second segment may be the same segment. In other embodiments, the first segment and the second segment may be different segments. Still further the method comprises applying a language map specific to the patient-specified language to at least a portion of the information associated with the portion of the plurality of segments of the HL7 message to generate a patient-specified-language-specific output to be utilized to generate the communication in the patient-specified language. Additionally, the method comprises generating, in the patient-specified language, the communication to be delivered to the patient in the patient-specified communication protocol.

Additional objects, advantages, and novel features of the technology are described below in the Detailed Description. They will, in part, become apparent to those skilled in the art, or they may be learned by practice of the technology.

BRIEF DESCRIPTION OF THE DRAWINGS

The present technology is described in detail herein with reference to the attached drawings figures, wherein.

DETAILED DESCRIPTION

Figure 1:
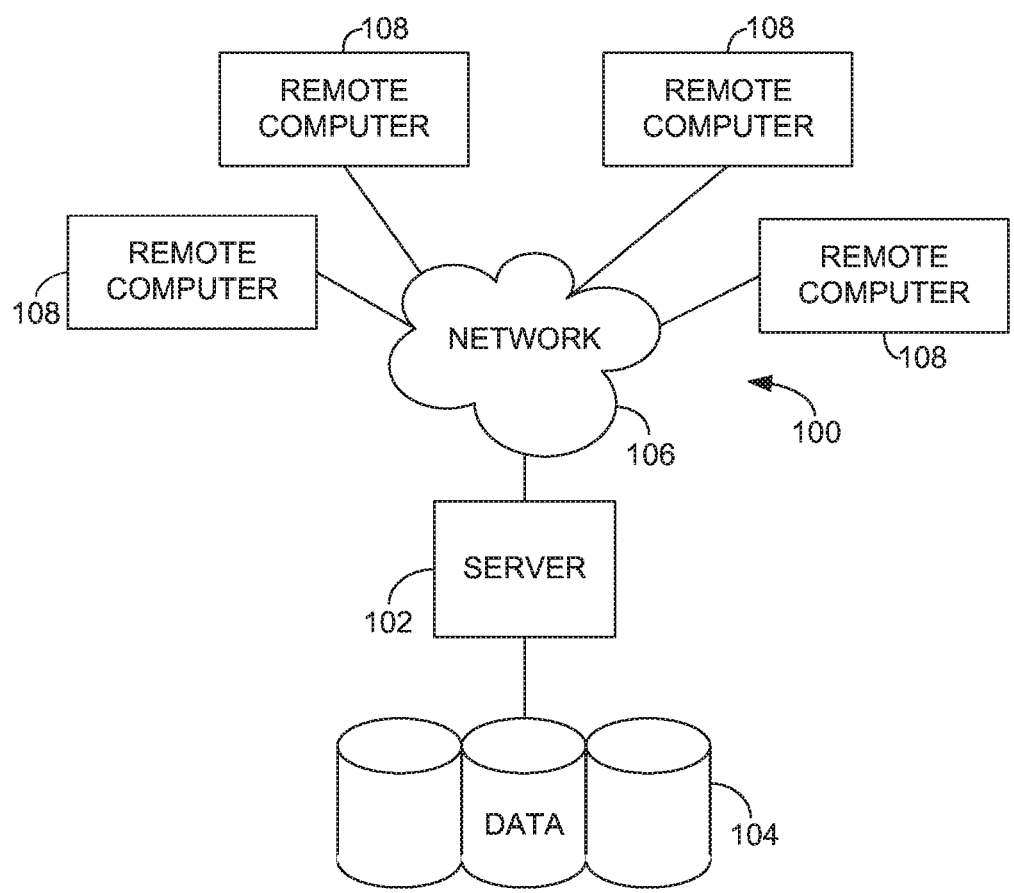
FIG. 1 is a schematic diagram depicting a computing device suitable for use in embodiments of the disclosed technology, in accordance with aspects described herein.

The subject matter of the present technology is described with specificity herein to meet statutory requirements. However, the description itself is not intended to limit the scope of this patent. Rather, the inventor has contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

It is estimated that approximately 6,500 different languages are spoken in the world today. While some of these languages are fairly obscure and spoken by only a small number of people, there are thousands of languages that enjoy significant usage. Some of these languages have undercurrents which are consistent enough that even speakers of those languages from different parts of the world can readily communicate with one another despite minor usage and/or pronunciation differences. Still others have national and/or regional dialects which differ significantly and, accordingly, cannot be understood by persons that speak a different dialect of the same language. For instance, the Indian native language has 22 officially-recognized dialects or languages that are spoken by members of the Indian population based upon the region of the country that they, or their ancestors, inhabit(ed). The officially-recognized dialects include Hindi, Bengali, Marathi, Urdu, Gujarati, Punjabi, Kashmiri, Sindhi, Assamese (Asamiya), Maithili, Odia, Bodo, Dogri, Kannada, Konkani, Malayalam, Manipuri, Nepali, Sanskrit, Santhali, Tamil, and Telugu. Speakers of one of these dialects, for instance Hindi, cannot readily communicate with speakers of another dialect, for instance Punjabi, if both speakers are able only to communicate in their regional dialects.

One area in which an inability to accurately communicate can have significant and sometimes dire consequences is that of healthcare. Healthcare needs of individuals vary dramatically and, depending upon where in the world an individual resides, there may or may not be adequate care available for one or more healthcare conditions of the individual. As such, it is often necessary for individuals to physically travel to other locations to receive healthcare or to engage in telemedicine visits using online technologies. In these, and countless other, situations, the healthcare providers and/or organizations with which the individual must communicate may have a primary language that differs from that of the affected individual.

When an individual having one primary communication language is engaged in face-to-face or real-time electronic communication with a healthcare provider having a different primary communication language, the healthcare provider and the individual readily may communicate through the use of a language interpreter, and such practice is fairly common. However, when a healthcare provider having a primary communication language desires to communicate with an individual having a different primary communication language outside of a real-time communication, use of an interpreter becomes less feasible. For instance, a healthcare provider may wish to communicate with an individual via email, Short Message Service (SMS) communication, Instant Message (IM), voice message, or the like. Such communications may convey any variety of information including, by way of example only, appointment reminders, medication reminders, medication dosage changes, test results, and the like. If such communications are delivered to an individual in the primary communication language of the healthcare provider/organization, and the individual's primary language of communication differs from that of the healthcare provider/organization, such information likely will not be understood by the recipient individual and, accordingly, appointments may be missed, medications may not be taken, medication dosage changes may not be implemented, or the like.

While in some instances an individual may be able to apply electronic translation functionality to a healthcare-related communication received from a healthcare provider/organization and/or have an interpreter translate the communication for them, in many instances the individual may not even understand that the communication is being communicated from their healthcare provider and thus may simply ignore a communication as an irrelevant solicitation, or the like, and not even realize that s/he should seek translation of the communication.

The present disclosure enables individuals (e.g., patients or proxies designated to receive healthcare-related communications of behalf of patients) to receive healthcare communications in a language of their choosing, regardless of the primary language in which the healthcare provider/organization communicates, utilizing a healthcare IT platform (such as Cerner Corporation manufactured software). In embodiments of the disclosure, a Health Level Seven (HL7) message is received. Health Level Seven (HL7) refers to a set of international standards for transfer of clinical and administrative data between software applications used by various healthcare providers. Thus, HL7 is an electronic data messaging protocol that enables messaging between applications across systems and that promotes interoperability between systems. A HL7 message is an example of an electronic data message. Generally, HL7 messages encode electronic data using American Standard Code for Information Interchange (ASCII).

A HL7 message comprises segments of related information. Each segment is independent of the other segments in an HL7 message, and segments may be optional or required depending on the type of HL7 message. The order of segments in an HL7 may vary depending on the type of HL7 message, as well. Segments are separated by carriage returns (e.g., <cr>, \r, or \x0D), generally. Each segment is labeled or identified with a header. Exemplary segment headers include, by way of example only, MSH (i.e., a message header that conveys the metadata of the HL7 message), PID (i.e., patient identification), NK1 (i.e., next of kin), PV1 (i.e., patient visit), SCH (i.e., scheduling activity information), OBR (i.e., observation request), RGS (i.e., resource group; used to identify relationships between resources for a scheduled event), and/or OBXI (i.e., observation result).

MSH headers include an identifier type of the HL7 messages. An identifier type, also known as an "event trigger," generally refers to a real-world event initiating communication of the HL7 message. Exemplary identifier types may include, by way of example only: "OMP_O09," indicating a pharmacy/treatment order; "RGR_RGR," indicating pharmacy/treatment dose information; "SIU_S12," indicating a notification of a new appointment booking; "SIU_S13," indicating a notification of appointment rescheduling; "SIU_S14," indicating a notification of an appointment modification; and "SIU_S15," indicating a notification of an appointment cancellation.

In accordance with embodiments of the present technology, a received HL7 message includes a plurality of segments, at least a portion of which have information associated therewith that is to be utilized to generate a healthcare-related communication to be delivered to a communication recipient (for instance, a patient or a proxy or delegate authorized by a patient to receive healthcare-related communications on the patient's behalf). In embodiments, one segment of the received HL7 message includes a language in which an intended communication recipient desires to receive communications. By, for instance, ascertaining the recipient-preferred language from the appropriate HL7 message segment, the language in which the communication recipient desires to receive communications is determined. Once the language in which the communication recipient desires to receive communications is determined, a language map specific to the determined language may be applied to at least a portion of the information associated with at least a portion of the segments of the HL7 message to generate a patient-specified-language-specific output to be utilized to deliver the communication in the patient-specified language.

With reference now to FIG. 1, an exemplary computing environment 100 suitable for use in implementing aspects of the technology is described below. An exemplary computing environment (e.g., a healthcare-related computing-system environment) with which embodiments may be implemented is described. The computing environment 100 is merely an example of one suitable computing environment and is not intended to suggest any limitation as to the scope of use or functionality of the technology. Neither should the computing environment 100 be interpreted as having any dependency or requirement relating to any single component or combination of components illustrated therein.

The present technology may be operational with numerous other purpose computing system environments or configurations. Examples of well-known computing systems, environments, and/or configurations that may be suitable for use with aspects of the present technology include personal computers, server computers, hand-held or laptop devices, multiprocessor systems, microprocessor-based systems, set top boxes, programmable consumer electronics, network PCs, minicomputers, mainframe computers, personal assistant devices, distributed computing environments that include any of the above-mentioned systems or devices, and the like.

The present technology may be described in the general context of computer-executable instructions, such as program modules, being executed by a computer. Exemplary program modules include routines, programs, objects, components, and data structures that perform particular tasks or implement particular abstract data types. The present technology may be practiced in distributed computing environments where tasks are performed by remote processing devices that are linked through a communications network. In a distributed computing environment, program modules may be located in association with local and/or remote computer storage media (e.g., memory storage devices).

The computing environment comprises a computing device in the form of a control server 102. Exemplary components of the control server comprise a processing unit, internal system memory, and a suitable system bus for coupling various system components, including data stores, with the control server. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The control server 102 typically includes, or has access to, a variety of non-transitory computer-readable media. Computer-readable media can be any available media that may be accessed by the control server 102, and includes volatile and nonvolatile media, as well as, removable and non-removable media. By way of example, and not limitation, computer-readable media may comprise computer storage media and communication media. Computer storage media includes volatile, nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server. Computer-readable media does not include signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above also should be included within the scope of computer-readable media.

The control server 102 may operate in a computer network using logical connections to one or more remote computers 108. The remote computers 108 may be located at a variety of locations including operating systems, device drivers and medical information workflows. The remote computers also may be physically located in traditional and nontraditional medical care environments so that the entire healthcare community may be capable of integration on the network. The remote computers might be personal computers, servers, routers, network PCs, peer devices, other common network nodes, or the like and might comprise some or all of the elements described above in relation to the control server 102. The devices can be personal digital assistants or other like devices.

The computer network 106 may comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof may be stored in association with the control server 102, the data store 104, or any of the remote computers 108. For example, various application programs may reside on the memory associated with any one or more of the remote computers 108. It will be understood and appreciated by those of ordinary skill in the art that the network connections shown are exemplary and other means of establishing a communications link between the computers (e.g., the control server 102 and the remote computers 108) may be utilized.

In operation, an organization may enter commands and information into the control server 102 or convey the commands and information to the control server 102 via one or more of the remote computers 108 through input devices, such as a keyboard, a microphone (e.g., voice inputs), a touch screen, a pointing device (commonly referred to as a mouse), a trackball, or a touch pad. Other input devices comprise satellite dishes, scanners, or the like. Commands and information also may be sent directly from a remote healthcare device to the control server 102. In addition to a monitor, the control server 102 and/or the remote computers 108 may comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
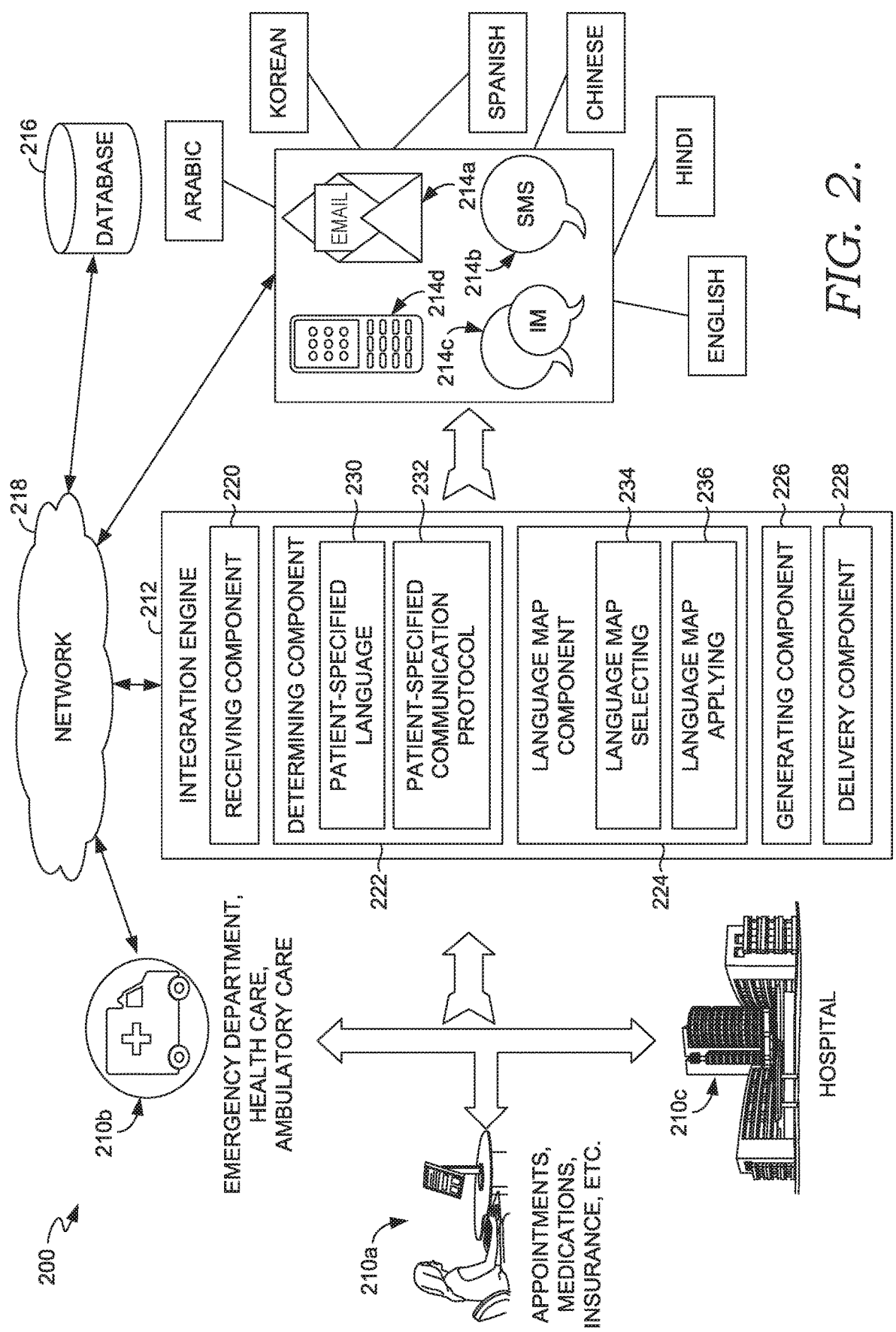
FIG. 2 is a schematic diagram depicting an exemplary system for use in embodiments of the disclosed technology, in accordance with aspects described herein.

Turning now to FIG. 2, illustrated is a block diagram of an exemplary system 200, in accordance with aspects described herein, for communicating healthcare-related information in languages specified by communication recipients (e.g., patients or patient proxies) utilizing a healthcare IT platform. Healthcare-related information may include any information related to a patient of a healthcare provider/organization and any information conveyed to an individual by a healthcare provider/organization. As such, healthcare-related information is not limited to clinical information but may include demographic information, insurance information, articles affecting an individual provided by a healthcare provider/organization, and the like. The content and/or volume of the information being communicated to a communication recipient is not intended to limit the scope of embodiments of the disclosed technology. It will be understood that the system 200 is provided as exemplary of an embodiment suitable for practicing the technology disclosed herein. Other arrangements of components (e.g., machines, interfaces, functions, orders, and groupings of functions, etc.) or sub-components can be used in addition to or instead of those shown, while some may be omitted.

With this in mind, the exemplary system 200 is illustrated as having a plurality of data input sources 210, an integration engine 212, a plurality of communication output devices 214 and a database 216, all in communication with one another through a network 218. The network 218 may be any type of communication scheme that allows devices to exchange data. For example, the network 218 may include fiber optic, wired and/or wireless communication capability in any of a plurality of protocols, such as TCP/IP, Ethernet, WAP, IEEE 802.11, or any other protocols. Implementations are contemplated in which the system 200 may be accessible through a shared public infrastructure (e.g., the Internet), an extranet, an intranet, a virtual private network (VPN), a local area network (LAN), a wide area network (WAN), a peer-to-peer (P2P) network, a wireless communications network, a telephone network, a facsimile network, a cloud network, or any combination thereof. Such networks are commonplace in today's computing environments and, accordingly, are not further described herein. Although many of the components illustrated in FIG. 2 are described as individual components or functional entities, in some cases, they may be implemented as discrete or distributed components, or in conjunction with other components, having any suitable location or combination.

The system 200 includes a plurality of data input sources 210a, 210b and 210c. Each of the data input sources 210 is configured for receiving input of healthcare-related data/information, at least a portion of which is to be utilized in generating communications to be communicated to communication recipients (e.g., patients or patient proxies) in languages specified by the recipients (or a proxies of the recipients), as more fully described below. As illustrated, the data input sources 210 include a provider device 210a capable of receiving healthcare-related data/information input at healthcare provider care locations (e.g., a healthcare clinic, physician's office, telemedicine administration location, etc.). The data input sources 210 further include a department device 210b capable of receiving healthcare-related data/information input at healthcare department locations (e.g., emergency departments). The data input sources 210 also include a hospital device 210c capable of receiving healthcare-related data/information input at any location within a hospital environment. It will be understood that the illustrated data input sources 210a, 210b and 210c are merely exemplary and are not intended to limit the scope of embodiments described herein. Any source capable of receiving input of healthcare-related data/information, at least a portion of which may be utilized in generating communications that may be communicated to communication recipients, may be considered a data input source 210, in accordance with embodiments hereof.

Exemplary data/information that may be input into the system 200 via the data input sources 210a, 210b and 210c may include, without limitation, appointment scheduling notices, appointment scheduling reminders, appointment scheduling change notifications medication reminders, medication dosage notices, medication dosage change notifications, medication administration frequency changes, healthcare-related insurance information, and the like. It will be understood that the above-described data/information is merely exemplary and is not intended to limit the scope of embodiments hereof. Any healthcare-related data/information, at least a portion of which may be communicated to communication recipients, may be received at the data input sources 210a, 210b and 210c, in accordance with embodiments described herein.

As illustrated, the system 200 includes an integration engine 212 configured for receiving healthcare-related data/information (e.g., from the one or more data input sources 210) and using at least a portion of the received data/information to generate outputs that may be utilized to generate healthcare-related communications in a communication recipient's specified language. In this regard, the integration engine 212 includes a receiving component 220, a determining component 222, a language map component 224, a generating component 226, and a delivery component 228. Each of the components of the integration engine 212 is discussed more fully below.

The illustrated system 200 includes a plurality of output devices 214a, 214b, 214c, and 214d. Each output device 214 is configured for receiving healthcare-related communications in a patient- or communication-recipient-specified language utilizing one or more communication protocols. As illustrated, the output device 214a is configured for receiving healthcare-related communications in a patient- or communication-recipient-specified language as email communications, output device 214b is configured for receiving healthcare-related communications in a patient- or communication-recipient-specified language as Short Message Service (SMS) communications, output device 214c is configured for receiving healthcare-related communications in a patient- or communication-recipient-specified language as Instant Messages (IMs), and output device 214d is configured for receiving healthcare-related communications in a patient- or communication-recipient-specified language as voice messages. It should be understood that instead of a plurality of distinct devices, the output devices 214 may alternatively be a single device capable of receiving healthcare-related communications in a patient- or communication-recipient-specified language via any number of communication protocols. The plurality of output devices 214a, 214b, 214c and 214d, each configured for receiving healthcare-related communications in a patient- or communication-recipient-specified language via a single communication protocol is illustrated merely for the sake of clarity. Any number of devices 214, each capable of receiving healthcare-related communications in a patient- or communication-recipient-specified language via any number of communication protocols, is contemplated within the scope of embodiments hereof.

The database 216 generally stores information including data, and/or computer instructions (e.g., software program instructions, routines, or services), used in aspects herein. The database 216 may comprise data memory. The database 216 may comprise patient information including electronic health records (EHRs), patient information, and the like. In embodiments, the patient information may include a designation of a language in which a patient desires to receive healthcare-related communications, a designation of a communication protocol via which a patient desires to receive healthcare-related communications, an identity of a proxy or designee of the patient authorized to receive healthcare-related communications on behalf of the patient, and/or information that may be utilized for communicating healthcare-related information via one or more communication protocols (e.g., an email address, telephone number, or the like). In some embodiments, the information included in the database 216 may be searchable. Although depicted as a single component, the database 216 may be embodied as one or more data stores or may be in the cloud.

As previously described, the system 200 includes an integration engine 212 configured to receive data/information and, using at least a portion of the received data/information, to generate outputs to be utilized to generate healthcare-related communications in a language specified by a patient or a proxy having authority to receive healthcare-related communications on behalf of a patient. In some embodiments, the integration engine 212 may comprise an OPENLink® server configuration. As illustrated, the integration engine 212 includes a receiving component 220, a determining component 222, a language map component 224, a generating component 226, and a delivery component 228.

The receiving component 220 is configured to receive HL7 messages that include, at least in part, information that healthcare providers desire to have communicated to patients or patient proxies. (The generation of messages complying with HL7 standards is known to those having ordinary skill in the art and, accordingly, is not further described herein.) The receiving component 220 is configured to receive HL7 messages having a plurality of segments, at least a portion of the plurality of segments having information associated therewith that is to be utilized to generate communications to be delivered to communication recipients. Such information may include, without limitation, patient identifying information (such as a patient name, a patient medical record number, a patient social security number, and the like) and/or healthcare-related information (such as information related to appointment scheduling, reminding, and/or cancelling; information related to medication administration, dosage, and/or frequency; healthcare-related insurance information; and the like). It will be understood that the above-described information is merely exemplary and is not intended to limit the scope of embodiments hereof. Information received by the receiving component 220 may include any and all information that may be useful in identifying a patient to whom (or about whom) a communication is to be delivered and any healthcare-related information, at least a portion of which may be communicated to a communication recipient, in accordance with embodiments described herein.

An exemplary HL7 message that may be received by the receiving component 220 is shown below:
MSH|^~&|HNAM^^SCHEDULE|MOH|20191225073000||
SIU^S12|Q999999T199999 999990||2.3|||||999999/1
SCH|32105200.000^HNAMSCHEVID|||||HOME Care^^^CD:
15560619||15|ZZ|^^15^20191225043000|||||^TEST^DOC^^^ ITWx
Onsite^^^^Personnel|||||^Test^Doc^^^ITWx Onsite^^^^Personnel||||Confirmed
ZBX|1||Activate order at check-in^Activate order at check-in||Y||||||Processing Option
ZBX|2||Dynamic durations^Dynamic durations||Y||||||Processing Option
ZBX|3||Force display of Appointment Attributes^Force display of Appointment Attributes||Y||||||Processing Option
ZBX|4||Require encounter at check-in^Require encounter at check-in||Y||||||Processing Option
ZBX|5||Require order association^Require order association||Y||||||Processing Option
ZBX|6||Dynamic resources (order personnel)^Dynamic resources (order personnel)||Y||||||Processing Option
ZBX|7||Dynamic resources (duration from order^Dynamic resources (duration from order||Y||||||Processing Option
PID|1||999999^^^MRN
MFH^MRN~999999^^^CMRN^CMRN~999999^^^HNAM^
PERSON_ID|999999^^^""^Passport~999999^^^National^
Health ID~999999^^^MRN-MFH^Account NumberTEST
TEST^MDH^TEST^^^^Current||19080701|F||National^^^
TEST^""^UAE^Home^^Unknown~^^TEST^TEST^""^United
Arab Emirates^Birth^^""^~^^^""^""^E-
mail^^""||123456789^Pager
personal|123456789^Business^""|Arabic|Married|Islam||
9999999999|999999999999||||""|0|""|""|E MIRATI||""
PV1|1|""||""|||||""|""|""|""|""|""|""|""|""|""|||||||""|""|""|""
||""
RGS|1
AIG|1||CD:15561300|CD:
4574||||20191225073000|0|ZZ|15|ZZ||CD:453

The determining component 222 is configured to determine a language in which a patient has specified that s/he desires to receive healthcare-related communications. The determining component 222 further is configured to determine a communication protocol through which a patient desires to receive healthcare-related communications. In this regard, the determining component 222 includes a patient-specified communication language determining subcomponent 230 and a patient-specified communication protocol determining subcomponent 232.

The patient-specified communication language determining subcomponent 230 is configured to determine a language in which a patient (or patient proxy) desires to receive healthcare-related communications. A language in which a patient desires to receive communications may be determined, by way of example only, by engaging in a lookup operation for a communication language specified in a language-preference portion of an HL7 message segment. Referring to the exemplary HL7 message illustrated above, the segment extending to the fifth line from the bottom of the HL7 message indicates that the patient has selected "Arabic" as the language in which s/he desires to receive healthcare-related communications. A determined language may be utilized in generating a healthcare-related patient communication, as more fully described below.

The patient-specified communication protocol determining subcomponent 232 is configured to determine a communication protocol that a patient (or patient proxy) desires to be utilized when healthcare-related communications are communicated. A communication protocol in which a patient desires to receive communications may be determined, by way of example only, by engaging in a lookup operation for a preferred communication protocol specified in a portion of a HL7 segment that specifies a communication protocol preference of a patient. Communication protocols may include, without limitation, SMS communication protocols, IM communication protocols, email communication protocols, and voice messaging communication protocols. Referring to the HL7 message illustrated above, the segment extending to the fifth line from the bottom of the HL7 message indicates that the patient prefers to receive healthcare-related communications in a format compatible with his/her personal pager, i.e., SMS. A determined patient-specified communication protocol may be utilized in generating an output to be utilized to generate a healthcare-related communication in a language specified by a patient or a proxy having authority to receive healthcare-related communications on behalf of a patient, as more fully described below.

Figure 3:
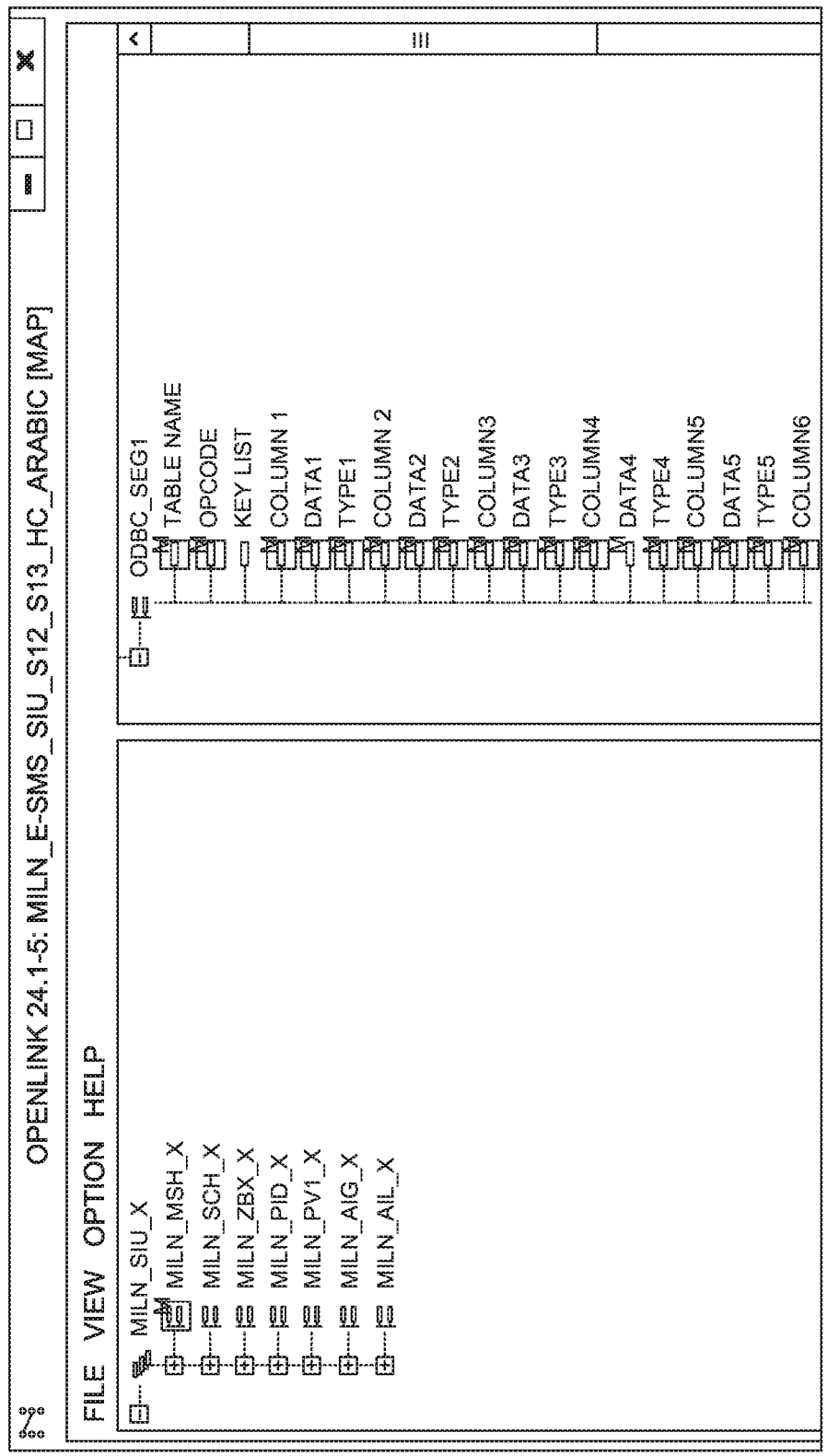
FIG. 3 depicts a screenshot of an exemplary language map for use in embodiments of the disclosed technology, in accordance with aspects described herein.

The language map component 226 of the integration engine 212 is configured to map HL7 messages to a language specified by a patient as preferred for receiving healthcare-related communications. In this regard, the language map component 226 includes a language map selecting subcomponent 234 and a language map applying subcomponent 236. The language map selecting subcomponent 234 is configured to, based upon the language determined as preferred for the patient (or proxy) to receive healthcare-related communications, select an appropriate language map for mapping HL7 messages to the patient-preferred language. In embodiments, the language map selecting subcomponent 234 may select, from a plurality of language maps (each map being specific to a particular language), a language map configured to map HL7 messages to a patient-specified (or proxy-specified) language. In some aspects, one or more of the plurality of language maps may be created utilizing an instrumental view of language that takes into account the meaning of the language (including tone, expression and complexity) rather than merely mapping the words comprising a communication via rote translation. An exemplary language map for mapping an HL7 message to Arabic is illustrated in FIG. 3.

The language map applying subcomponent 236 is configured to apply a language map configured to map HL7 messages to a language specified by a patient (or patient proxy) for receiving healthcare-related communications. Once an appropriate language map is applied, a communication that is consumable by the patient, which is in the patient's preferred language for receiving healthcare-related communications, may be generated, as more fully described below.

The generating component 226 is configured to generate, from HL7 messages, an output that is in a format compatible with a patient-selected (or proxy-selected) communication protocol and that may be utilized to generate communications to be delivered to a patient (or patient proxy) in a patient-specified language. Outputs generated from HL7 messages may include at least a portion, but not necessarily all, of the information contained in the segments of a received HL7 message.

An exemplary output that may be generated by the generating component 226 is shown below:
|SMS|wareed|wareed|3
|SMS|.[dbo.][WCS_Queue]|!|||Body|(Arabic characters)
MDH TEST TEST TEST, (Arabic characters)
25 (Arabic Characters) DEC·2019 (Arabic characters)
07:30|S|EventID|320392|2.000|S|recipient_address|05659
999999|S|subjet|SMS
Message|S|Facility|CKJF Julphar Clinic|S|Create_DTTM|2019-12-11
10:45|S|CreateName|RAzaUsman|S|CreateID||S|Update_DTTM|2019-12-11
1O:45|S|UpdateID||S|UpdateName|RazaUsman|S (Note that each location in which the above message reads "(Arabic characters)" there are actual Arabic characters in the message rather than the denotation of such.)

The delivery component 228 is configured to transmit healthcare-related communications generated in a patient's (or patient proxy's) language of choice to the patient or other authorized communication recipient. In embodiments, such communications may be delivered via one or more patient-specified communication protocols. Any number of communication protocols may be utilized including, without limitation, Short Message Service (SMS), instant messaging, email, and voice messaging.

Figure 4:
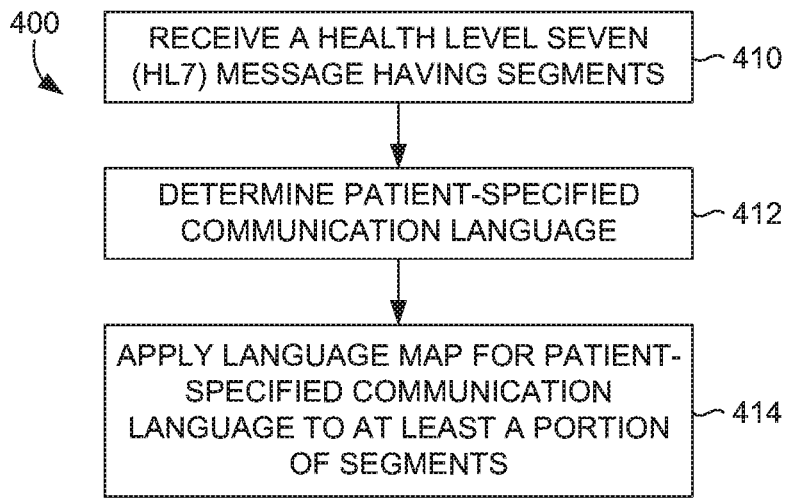
FIG. 4 is a flow diagram depicting an exemplary method 400 for communicating healthcare-related information in a language specified by a communication recipient (or an individual for whom the communication recipient is a proxy) utilizing a healthcare IT platform, in accordance with aspects described herein.

With reference now to FIG. 4, illustrated is a flow diagram of an exemplary method 400 for communicating healthcare-related information in a language specified by a communication recipient (or an individual for whom the communication recipient is a proxy) utilizing a healthcare IT platform, in accordance with embodiments of the present disclosure. As indicated at block 410, a Health Level 7 (HL7) message is received, the HL7 message having a plurality of segments, at least a portion of which have information associated therewith that is to be utilized to generate a communication to be delivered to a communication recipient. The HL7 message may be received, for instance, by the receiving component 220 of the integration engine 212 illustrated in FIG. 2.

As indicated at block 412, a language in which communications containing healthcare-related information are to be received by the communication recipient is determined based on a first of the plurality of segments of the HL7 message. Such language may be determined, by way of example, by the patient-specified communication language determining subcomponent 230 of the determining component 222 of the integration engine 212 illustrated in FIG. 2.

As indicated at block 414, a language map specific to the determined language is applied to at least a portion of the plurality of segments of the received HL7 message (e.g., utilizing the language map applying subcomponent 236 of the language map component 224 of the integration engine 212 illustrated in FIG. 2) to generate an output to be utilized to generate a healthcare-related communication in the determined language.

Figure 5:
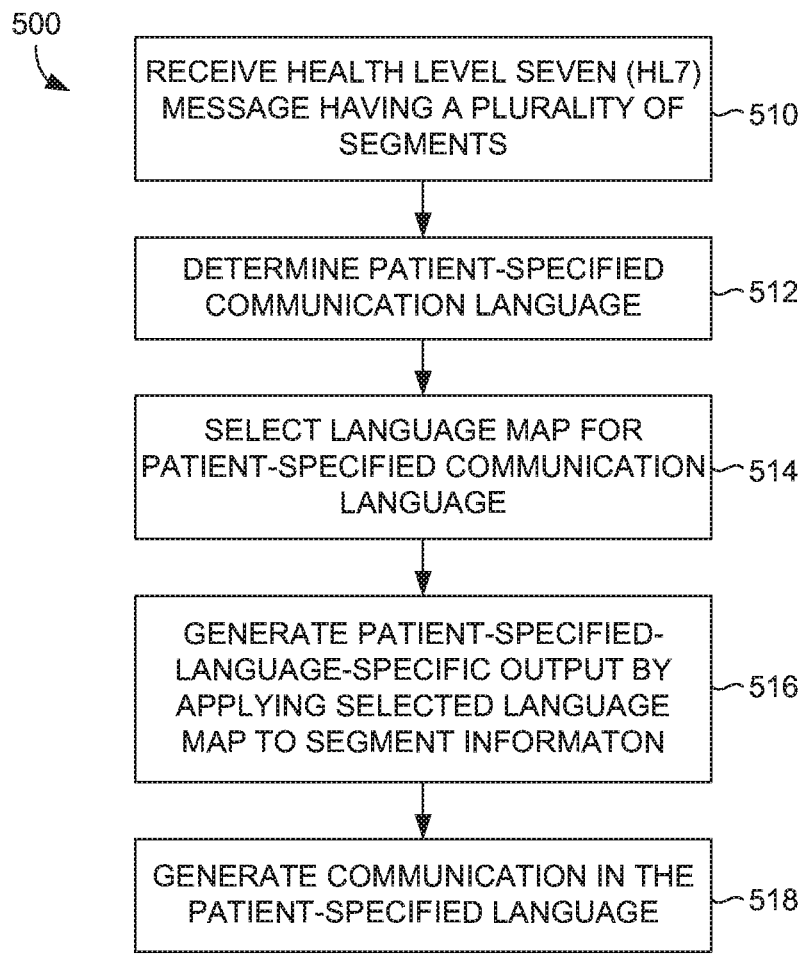
FIG. 5 a flow diagram depicting an exemplary method 500 for communicating healthcare-related information in a patient-specified language utilizing a healthcare IT platform, in accordance with aspects described herein.

Turning to FIG. 5, illustrated is a flow diagram of an exemplary method 500 for communicating healthcare-related information in a patient-specified language utilizing a healthcare IT platform, in accordance with embodiments of the present disclosure. As indicated at block 510, a HL7 message is received, the HL7 message having a plurality of segments, at least a portion of the plurality of segments having information associated therewith that is to be utilized to generate a communication to be delivered to a patient. The HL7 message may be received, e.g., by the receiving component 220 of the integration engine 212 illustrated in FIG. 2.

As indicated at block 512, a language in which healthcare-related communications are to be delivered to the patient (or a proxy designated to receive messages on the patient's behalf) is determined based on a first of the plurality of segments of the HL7 message. Such language may be determined, e.g., by the patient-specified communication language determining subcomponent 230 of the determining component 222 of the integration engine 212 illustrated in FIG. 2.

As indicated at block 514, a language map is selected (e.g., by the language map selecting subcomponent 234 of the language map component 224 of the integration engine 212 illustrated in FIG. 2), the language map being configured to utilize at least a portion of the information associated with the at least the portion of the plurality of segments of the HL7 message to generate a patient-specified-language-specific output to be utilized to generate the communication in the patient-specified language.

As indicated at block 516, a patient-specified-language-specific output is generated in the determined language (for instance, by the patient communication generating component 226 of the integration engine 212 illustrated in FIG. 2) by applying the selected language map to the at least the portion of the information associated with the at least the portion of the plurality of segments of the HL7 message. As indicated at block 520, the communication to be delivered to the patient is generated to the patient (by, for instance, the patient communication generating component 226 of the integration engine 212 illustrated in FIG. 2).

Figure 6:
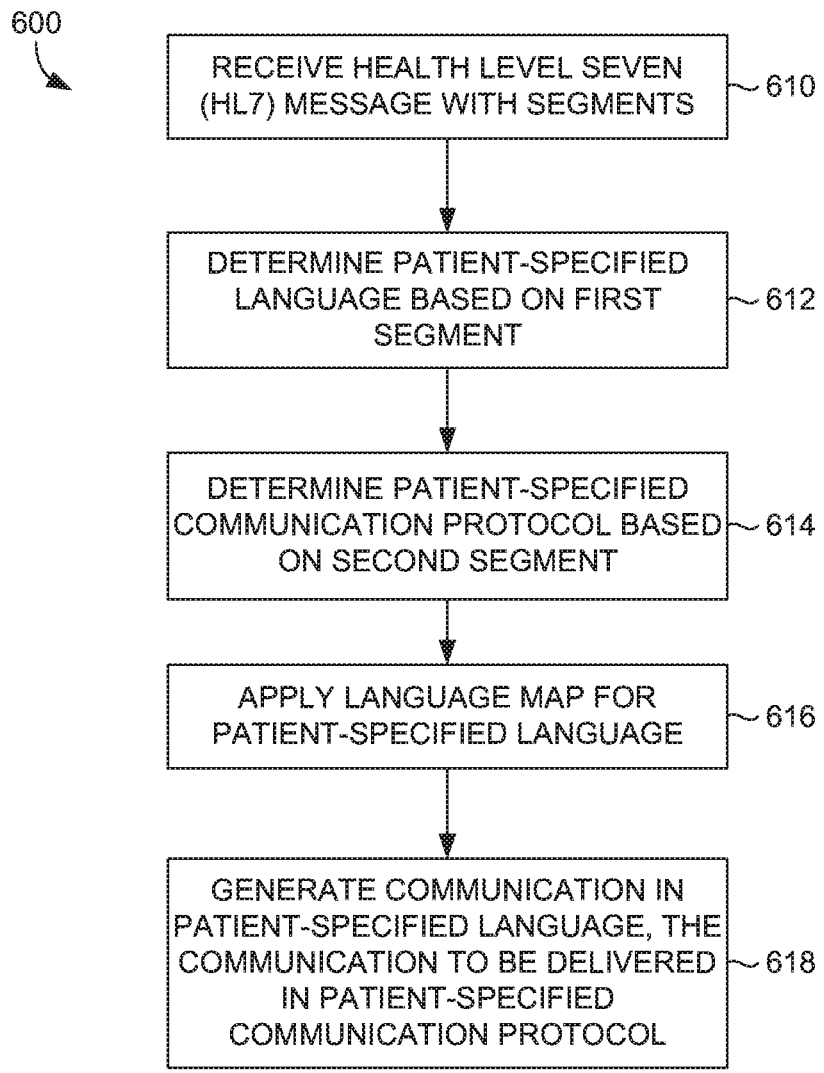
FIG. 6 a flow diagram depicting an exemplary method 600 for communicating healthcare-related information in a language specified by a patient (or a proxy of a patient) utilizing a healthcare IT platform, in accordance with aspects described herein.

With reference now to FIG. 6, illustrated is a flow diagram of an exemplary method 600 for communicating healthcare-related information in a language specified by a patient (or a proxy of a patient) utilizing a healthcare IT platform, in accordance with embodiments of the present disclosure. As indicated at block 610, a HL7 message is received (e.g., by the receiving component 220 of the integration engine 212 illustrated in FIG. 2), the HL7 message having a plurality of segments, at least a portion of which have information associated therewith that is to be utilized in generating a communication to be communicated to a patient (or patient proxy). As indicated at block 612, based on a first of the plurality of segments of the HL7 message, a patient-specified language is determined in which the communication to be communicated to the patient is to be generated. Such language may be determined, e.g., by the patient-specified communication language determining subcomponent 230 of the determining component 222 of the integration engine 212 illustrated in FIG. 2.

As indicated at block 614, based on a second of the plurality of segments of the HL7 message, a communication protocol specified by the patient (or the patient's proxy) is determined that is to be utilized to communicate the communication to the patient, for instance, by the patient-specified communication protocol determining subcomponent 232 of the determining component 222 of the integration engine 212 illustrated in FIG. 2. In some embodiments, the first of the plurality of segments and the second of the plurality of segments may be the same. In other embodiments, the first and second of the plurality of segments may be different segments.

As indicated at block 616, a language map specific to the patient-specified language is applied to at least a portion of the information associated with the portion of the plurality of segments of the HL7 message to generate a patient-specified-language-specific output to be utilized to generate the healthcare-related communication in the patient-specified language. Such language map may be applied, by way of example, by the language map applying subcomponent 236 of the language map component 224 of the integration engine 212 illustrated in FIG. 2.

As indicated at block 618, the communication to be delivered to the patient is generated in the patient-specified language (e.g., by the generating component 226 of the integration engine 212 illustrated in FIG. 2).

From the foregoing, it will be seen that the disclosed technology is one well adapted to attain all the ends and objects described, together with other advantages which are obvious and inherent to the structure. It will be understood that certain features and sub-combinations are of utility and may be employed without reference to other features and sub-combinations. This is contemplated by and is within the scope of the claims. Since many possible embodiments may be made of the present technology without departing from the scope, it is to be understood that all matter described or shown in the accompanying drawings is to be interpreted as illustrative and not in a limiting sense.

What is claimed is:

1. A computerized method comprising:
receiving, from a data source associated with a healthcare entity, a Health Level 7 (HL7) message having a plurality of segments encoding information for communication to a device associated with a recipient;
using a lookup operation that is performed by an integration engine, identifying a particular segment in the plurality of segments that is associated with language preferences;
determining, based on the particular segment, a preferred language that is associated with the recipient;
applying a language map that is specific to the preferred language to at least a portion of the plurality of segments encoding the information to render the information in the preferred language;
generating a communication that includes the information in the preferred language based on applying the language map; and
communicating the communication to the device associated with the recipient.

2. The computerized method of claim 1, further comprising determining, based on another segment in the plurality of segments of the HL7 message, an identity of the recipient.

3. The computerized method of claim 1, wherein the recipient is a patient.

4. The computerized method of claim 1, wherein the recipient is a communication proxy for a patient.

5. The computerized method of claim 1, wherein the preferred language is a regional dialect.

6. The computerized method of claim 1, further comprising selecting the language map specific to the preferred language.

7. The computerized method of claim 1, wherein the language map specific to the preferred language is based upon an instrumental view of language.

8. The computerized method of claim 1, further comprising, determining, based on another segment in the plurality of segments of the HL7 message, a specified communication protocol in which the communication is to be delivered to the recipient.

9. The computerized method of claim 8, wherein the specified communication protocol is one of Short Message Service (SMS), instant messaging, email, and voice messaging.

10. One or more non-transitory computer-readable media having computer-executable instructions embodied thereon that, when executed, perform a method comprising:
receiving, from a data source associated with a healthcare entity, a Health Level 7 (HL7) message having a plurality of segments, at least a portion of the plurality of segments encoding information for communication to a device associated with a patient;
using a lookup operation that is performed by an integration engine, identifying a particular segment in the plurality of segments that is associated with language preferences;
determining a preferred language that is specified in the particular segment;
selecting a language map that corresponds to the preferred language;
generating, by the integration engine, a communication that includes the information in the preferred language by applying the language map to the at least the portion of the plurality of segments encoding the information to render the information in the preferred language; and
communicating, from the integration engine, the communication to the device associated with the patient.

11. The media of claim 10, wherein the patient-specified language is a regional dialect.

12. The media of claim 10, wherein the language map is based on an instrumental view of language.

13. The media of claim 10, wherein the method further comprises determining, based on at least one segment in the plurality of segments of the HL7 message, a communication protocol to be utilized to deliver the communication.

14. The media of claim 13, wherein the determined communication protocol is one of Short Message Service (SMS), instant messaging, email, and voice messaging.

15. The media of claim 13, wherein the at least one segment for the communication protocol is the same as the particular segment that is associated with language preferences.

16. A system comprising:
an integration engine having one or more processors, wherein the integration engine is configured for, via the one or more processors:
receiving, from a data source associated with a healthcare entity, a Health Level 7 (HL7) message having a plurality of segments, at least a portion of the plurality of segments encoding information for communication to a device associated with a patient;
using a lookup operation that is performed by an integration engine, identifying a particular segment in the plurality of segments that is associated with language preferences of the patient;
determining a preferred language that is specified in the particular segment;
determining, based on another particular segment in the plurality of segments of the HL7 message, a preferred communication protocol associated with the patient;
applying a language map that is specific to the preferred language to at least a portion of the plurality of segments encoding the information to render the information in the preferred language;
generating a communication that includes the information in the preferred language; and
communicating the communication to the device associated with the patient using the preferred communication protocol.

17. The system of claim 16, wherein the patient-specified language is a regional dialect.

18. The system of claim 16, wherein the method further comprises selecting the language map specific to the patient-specified language.

19. The system of claim 16, wherein the language map is based upon an instrumental view of language.

20. The system of claim 16, wherein the communication protocol is one of Short Message Service (SMS), instant messaging, email, and voice messaging.

* * * * *